3,755,489
SYNTHESIS OF 1,2-BUTADIENE
Durward T. Roberts, Jr. and Edward L. Kay, Akron, Lawrence E. Calihan, Cuyahoga Falls, and Lynn B. Wakefield, Akron, Ohio, assignors to The Firestone Tire & Rubber Company, Akron, Ohio
No Drawing. Filed Mar. 1, 1972, Ser. No. 230,961
Int. Cl. C07c 5/24
U.S. Cl. 260—680 R           5 Claims

ABSTRACT OF THE DISCLOSURE

Significant quantities of 1,2-butadiene are produced from a 2-butyne feed stream by placing the feed stream in contact with a base-treated catalyst comprising silica or alumina for from 1.0 to 100 seconds at a temperature of from about 200° C. to about 600° C., and recovering the desired 1,2-butadiene from the products thus formed.

BACKGROUND OF THE INVENTION

This invention relates to a process for the catalytic, vapor-phase isomerization of 2-butyne to 1,2-butadiene.

It is well known that isomerization of hydrocarbon compounds can be accomplished by passing the hydrocarbon in the vapor state over a suitable catalyst. By judicious choice of a catalyst, yields of the desired product can be optimized. One such reaction is disclosed in U.S. Patent 3,052,740, wherein methyl acetylene is isomerized to propadiene, using a catalyst of sodium or potassium aluminate.

The production of 1,2-butadiene from 2-butyne would seem to be closely related to the above cited process; however, a serious obstacle presents itself at once. Thermodynamic calculations show that of the various four-carbon isomers which can be present in equilibrium the conjugated diene, 1,3-butadiene is overwhelmingly favored. Thus, proceeding from a process using three-carbon feed and products to a four-carbon system introduces additional isomers, and results, in theory, in a process which is unsuitable, by reason of very low yields of the desired product, and extremely high yields of a material (1,3-butadiene) which tends to polymerize under the conditions employed.

SUMMARY OF THE INVENTION

It has now surprisingly been found that 2-butyne can be isomerized to 1,2-butadiene by passing the feed material over a catalyst of base-treated alumina, silica, or combinations thereof, at a temperature of from about 200° C. to about 600° C., preferably from about 300° C. to about 400° C. Contact times of from 0.1 to 100 seconds, preferably 5 to 50 seconds are required, and substantial yields of the desired 1,2-butadiene are separated and recovered from the reaction products. The preferred catalyst has a surface area of from 1 to 1000 square meters per gram, and the base-treatment preferably incorporates from 1 to 25% by weight of alkali metal compound into the catalyst composition, figuring the alkali metal compound as an oxide.

PREFERRED EMBODIMENTS OF THE INVENTION

Catalyst

The catalyst can be obtained by base-treating a wide variety of silica or alumina materials, or combinations of silica and alumina. If a combination of silica and alumina is used, it can be a naturally occurring combination, such as is found in a variety of clays. The material can be treated so as to "activate" it; that is to increase its surface area within the specified limits of 1 to 1000 square meters per gram. So-called "molecular sieve" materials can be used, also.

Base-treatment of the silica and/or alumina catalyst is necessary, in order to modify these normally acidic materials for use in the invention. This is a well-known technique in catalysis, and can be accomplished in any of several ways, such as by impregnating a silica and/or alumina catalyst with a solution of a base, such as NaOH, $Ca(OH)_2$, or KOH, and drying and calcining the treated catalyst. Such treatment is sometimes referred to as "doping," or as "poisoning" or "inhibiting" the catalyst.

In the process of the invention, base-treatment is preferably accomplished by depositing on the surface (and/or in the pores) of the catalyst a compound which, on drying and calcining, leaves an alkaline earth or alkali metal base, in the amount of 1 to 25% by weight. Especially preferred for this purpose is the use of an alkali metal hydroxide in water solution. Any of a number of alkali metal or alkaline earth compounds can be used for the base-treatment, provided that on drying and calcining, a base material is formed. In this regard, an alkali metal salt may be employed, such as, for example, sodium carbonate, potassium acetate, or lithium amide. Useful alkaline earth compounds include various salts of calcium, strontium or barium, which form oxides of these metals on calcining.

Fluid-bed catalysts can be used, with the catalyst in a fine particle size, or fixed beds, employing the catalyst in pellet or granular form. Any suitable reaction vessel can be used, as known in the art. Separation of the desired product can be accomplished by distillation, and the unreacted 2-butyne can be re-cycled.

Preferred operating temperatures in the reactor range from 300° C. to 500° C. Below 300° C. the conversion of 2-butyne is low, and above 500° C. substantial amounts of unwanted by-products are formed, including higher molecular weight materials. Temperatures above 500° C. promote the formation of dimers and oligomers and cracking of the feed material.

Preferred contact times should be from 5 to 100 seconds for best operation. Below 5 seconds conversion figures drop off, and above 100 seconds the throughput is insufficient for economical operation.

A more complete understanding of the process of the invention may be obtained by reference to the following examples, which are presented for purposes of illustration, and should not be construed as limiting the scope of the invention. Unless otherwise indicated, all parts and percentages are by weight.

EXAMPLE I

A base-treated alumina catalyst was prepared in the following manner: 10 grams of metallic sodium were dissolved in 1500 grams of anhydrous liquid ammonia. Addition of a crystal of ferric nitrate facilitated solution. To this mixture was added 100 grams of about 200 m.²/g. surface area gamma-alumina which had been thoroughly dried. The mixture was evaporated to dryness, and heated to 400° C. for four hours away from air or $CO_2$.

EXAMPLE II

A second catalyst was prepared from the same source of gamma-alumina, as follows: 100 grams of dry gamma-alumina and 25 grams of KOH were added to 750 ml. of water, and the mixture was heated and agitated at its boiling point. The water was then evaporated and the catalyst was then dried and calcined.

EXAMPLE III

A heated, cylindrical reactor was charged with 30 gm. of the catalyst of Example I, and gaseous 1,2-butadiene was passed through the reactor at various flow rates and temperatures. The materials leaving the reactor were analyzed for their composition. Results are summarized in the following Table I:

TABLE I

| Run No. | Temp., °C. | Flow rate, cc./min. | Analysis, by percent | | | |
|---|---|---|---|---|---|---|
| | | | 1,2-BD | 1,3-BD | 2-butyne | Other |
| 1 | 275 | 20 | Trace | 50 | 0 | 50 |
| 2 | 200 | 20 | 1.5 | 80 | 13 | 5 |
| 3 | 110 | 20 | 2 | 3 | 92 | 3 |
| 4 | 25 | 20 | 3 | 3 | 91 | 3 |
| 5 | 25 | 50 | 10 | 1 | 87 | 2 |
| 6 | 90 | 50 | 5 | 1 | 90 | 4 |
| 7 | 190 | 50 | 10 | 15 | 70 | 5 |
| 8 | 300 | 50 | 20 | 3 | 68 | 7 |
| 9 | 400 | 50 | 20 | 15 | 65 | 10 |
| 10 | 400 | 20 | 15 | 30 | 47 | 8 |
| 11 | 400 | 10 | 11 | 41 | 36 | 12 |
| 12 | 500 | 50 | 10 | 30 | 48 | 14 |
| 13 | 500 | 70 | 10 | 20 | 50 | 20 |

The catalyst volume was calculated to be 30 cc., and the flow-rates of 10, 20, 50 and 70 cc./min. thus correspond to contact times of 180, 90, 36 and 26 seconds, respectively.

1,2-Butadiene was used as the feed in order to determine if the thermodynamic equilibrium of the $C_4H_{2n-2}$ isomers is approached or reached.

Runs 1 and 2 show that the thermodynamically most stable isomer (1,3-butadiene) is produced in significant quantities, if specific reaction conditions are employed. Runs 7 through 13 demonstrate that, unexpectedly, the catalyst *can* produce a product containing very low amounts of 1,3-butadiene, however. Additionally, a temperature range of from about 300° C. to 400° C. is the best area for operation.

EXAMPLE IV

The procedure of Example III was repeated, except that 2-butyne was substituted for 1,2-butadiene as the feed material. Results are summarized in Table II, following.

TABLE II

| Run No. | Temp., °C. | Flow rate, cc./min. | Analysis, by percent | | | | |
|---|---|---|---|---|---|---|---|
| | | | 1,2-BD | 1,3-BD | 2-butyne | 1-butyne | Other |
| 14 | 300 | 60 | 9.0 | 0.1 | 88.0 | 0.7 | 2.2 |
| 15 | 350 | 55 | 14.0 | 0.1 | 81.9 | 2.3 | 1.7 |
| 16 | 400 | 55 | 19.5 | 2.4 | 69.2 | 7.6 | 1.3 |

From a calculated catalyst volume of 30 cc., contact times of 30, 33 and 33 seconds, respectively, were calculated.

Example IV demonstrated that 2-butyne can be isomerized using the catalyst of the invention, to produce significantly large quantities of 1,2-butadiene, and unexpectedly low levels of 1,3-butadiene.

EXAMPLE V

In the same manner as in Example IV, 15 grams of the catalyst of Example II was placed in a reactor and 2-butyne was passed through the catalyst. The results are summarized in the following Table III.

TABLE III

| Run No. | Temp., °C. | Flow rate, cc./min. | Analysis, by percent | | | | |
|---|---|---|---|---|---|---|---|
| | | | 1,2-BD | 1,3-BD | 2-butyne | 1-butyne | Other |
| 17 | 290 | 50 | 10.6 | 13.8 | 70.3 | 3.7 | 1.6 |
| 18 | 290 | 50 | 11.8 | 2.6 | 80.8 | 3.2 | 1.4 |
| 19 | 300 | 60 | 12.6 | 1.9 | 80.4 | 3.1 | 2.0 |
| 20 | 325 | 50 | 15.1 | 0.9 | 77.0 | 4.3 | 2.7 |
| 21 | 400 | 70 | 16.0 | 17.2 | 59.6 | 6.2 | 1.0 |

Catalyst volume was calculated as 15 cc., giving contact times of 13 to 18 seconds.

EXAMPLE VI

A number of other catalysts were investigated, and properties of these catalysts are listed in Table IV following. Catalyst A was a base-treated $SiO_2$; Catalyst B was a base-treated mixture of 75% $SiO_2$ and 25% gamma alumina; Catalyst C was a base-treated alpha alumina; Catalysts D and E were sodium zeolite molecular sieve materials, with reported chemical compositions of $Na_{56}(AlO_2)_{56}(SiO_2)_{136}$, and $Na_{86}(AlO_2)_{86}(SiO_2)_{106}$, respectively.

TABLE IV

| Catalyst | Base treatment | Surface area, M.²/g. |
|---|---|---|
| A | 3% NaOH | 150 |
| B | 15% NaOH | 66–228 |
| C | 15% NaOH | 10 |
| D | | 500–700 |
| E | | 500–700 |

EXAMPLE VII

Using the catalysts of the preceding example, a 2-butyne feed material was passed through a reactor, as in Example IV. All runs were made at 400° C. The product materials were analyzed and results are summarized in the following Table V.

TABLE V

| Catalyst | Contact time, sec. | Analysis | | | | |
|---|---|---|---|---|---|---|
| | | 1,2-BD | 1,3-BD | 2-butyne | 1-butyne | Other |
| A | 20 | 16.3 | 0.4 | 77.3 | 4.9 | 0.9 |
| B | 12.5 | 21.0 | 1.4 | 69.4 | 7.5 | 0.7 |
| C | 10 | 13.4 | 4.8 | 69.8 | 6.8 | 0.3 |
| D | 60 | 11.4 | 0.8 | 82.6 | 2.3 | 2.7 |
| E | 25 | 14.6 | 4.1 | 69.5 | 4.0 | 7.7 |

From the foregoing examples it can be seen that, within the limits set forth, a wide variety of catalytic materials are effective in the process of the invention.

The desired product of the invention, 1,2-butadiene has been found to be useful as a modifier for polymerization reactions, and can, by use of the process, be produced in substantial quantities for 2-butyne, a by-product of the production of 1,3-butadiene. The substantial quantities of 2-butyne which are not converted can be recycled through the reactor.

What is claimed is:

1. The process of producing 1,2-butadiene from 2-butyne by the steps of
   contacting the 2-butyne with a catalyst comprising silica or alumina which catalyst has been treated with an alkali or alkaline earth metal compound so as to incorporate from 1 to 25% by weight of the alkali or alkaline earth metal compound thereon, calculated as the oxide thereof at a temperature of from about 200° to about 600° C. for 0.1 to 100 seconds to produce a reaction product mixture containing at least about 10% 1,2-butadiene, and
   separating and recovering the 1,2-butadiene from the reaction product mixture thus produced.

2. The process of claim 1, wherein the catalyst has a surface area of from 1 to 1000 square meters per gram.

3. The process of claim 2, wherein the catalyst has a surface area of from 5 to 300 square meters per gram.

4. The process of claim 1, wherein the alkali metal compound is sodium or potassium amide or sodium or potassium hydroxide.

5. The process of claim 1, wherein the contact time is 5 to 50 seconds.

(References on following page)

References Cited

UNITED STATES PATENTS

| | | | |
|---|---|---|---|
| 3,671,605 | 6/1972 | Smith | 260—578 |
| 2,325,398 | 1/1940 | Hearne et al. | 160—680 |
| 3,596,927 | 8/1971 | Mitchell et al. | 260—683.2 |
| 3,655,804 | 4/1972 | Pennella | 260—678 |

FOREIGN PATENTS

| | | | |
|---|---|---|---|
| 507,847 | 6/1939 | Great Britain | 260—680 |

OTHER REFERENCES

Faraday's Encyclopedia of Hydrocarbon Compounds ($C_4$–$C_5$), vol. 1b, p. 0401.00.01 (1946).

PAUL M. COUGHLAN, JR., Primary Examiner

U.S. Cl. X.R.

260—678

PO-1050
(5/69)

UNITED STATES PATENT OFFICE
CERTIFICATE OF CORRECTION

Patent No. 3,755,489                Dated August 28, 1973

Inventor(s) Durward T. Roberts, Jr.; Edward L. Kay; Lawrence E. Calihan; and Lynn B. Wakefield It is certified that error appears in the above-identified patent and that said Letters Patent are hereby corrected as shown below:

Col. 4, line 47, "for" should read --from--

Signed and sealed this 20th day of November 1973.

(SEAL)
Attest:

EDWARD M. FLETCHER, JR.
Attesting Officer

RENE D. TEGTMEYER
Acting Commissioner of Patents